US005644971A

United States Patent [19]

Ward

[11] Patent Number: 5,644,971

[45] Date of Patent: Jul. 8, 1997

[54] VESSEL FOR STEEPING OF GRAIN

[75] Inventor: Stephen Daniel Ward, Lewisburg, Pa.

[73] Assignee: Andritz Sprout-Bauer, Inc., Muncy, Pa.

[21] Appl. No.: 489,818

[22] Filed: Jun. 13, 1995

[51] Int. Cl.$^{6}$ .................... A23B 9/00

[52] U.S. Cl. .................... 99/278; 99/485; 366/101

[58] Field of Search .................... 99/278, 279, 276, 99/277, 277.1, 277.2, 485, 467; 366/101, 106, 107, 136, 137, 159.1; 426/7, 16, 28, 29

[56] References Cited

U.S. PATENT DOCUMENTS

| | | | |
|---|---|---|---|
| 3,138,369 | 6/1964 | Bennett | 366/136 |
| 3,583,681 | 6/1971 | Brown | 366/136 |
| 3,636,856 | 1/1972 | Neel | 366/136 |
| 3,807,705 | 4/1974 | Humkey | 366/101 |
| 3,830,473 | 8/1974 | Lieferman | 366/136 |
| 4,126,546 | 11/1978 | Hjelmner et al. | |
| 5,018,869 | 5/1991 | Paul | 366/101 |

OTHER PUBLICATIONS

PCT International Publication No. WO 94/01194, published Jan. 20, 1994 for Deep Bed Sand Filter.
International Search Report —PCT/US 93/04196.

*Primary Examiner*—Robert W. Jenkins
*Attorney, Agent, or Firm*—Chilton, Alix & Van Kirk

[57] ABSTRACT

A vessel for steeping grain having a tank (12). A central column (44) is disposed in the center of the tank (12) having transport lines (42) with air lifts (46) on the lower end of the lines for the transporting of grain and steeping fluid from the bottom of the tank to the top of the tank. Air for the air lifts (46) is introduced to the air lifts along line (50). Air is withdrawn from the tank by line 25 and compressed for the line (50) by air compressor (27).

48 Claims, 5 Drawing Sheets

VESSEL FOR STEEPING OF GRAIN

BACKGROUND OF THE INVENTION

The present invention relates to grain milling. More particularly, the present invention relates to tanks for the steeping of grain.

Grain steeping tanks are used in the hydration of grains to soften the grain for milling. In a conventional grain steeper, grain is soaked in a liquid for a sufficient period of time to allow the grain to soften prior to refining and milling procedures to separate the grain into component parts. A conventional grain steeping vessel is a large tank on the order of ten feet in diameter and extending upwards to sixty feet or more. The tank is filled with a mixture of grain, water and $SO_2$. The $SO_2$ aids in the absorption of water by the grain, most typically corn. The $SO_2$ is at least partially consumed in the steeping process. Once the steeping vessel is filled, it is sealed from atmosphere. The grain is allowed the steep for as long as forty hours to fully soften the grain. The steeping time, however, has been decreased to as little as 32 hours to speed up the milling production process. This reduction in time has been accompanied by a reduction of the quality of the steeped grain, because the steeping process has not improved. The result has been that the grain has been transferred to the milling process in a form harder than would be preferred for optimum milling.

In the conventional grain steeping apparatus, the grain and liquid mixture has been allowed to simply rest. However, this results in uneven and incomplete steeping of the grain. The steeping process involves the grain absorbing water. This water absorption aids in the process of breaking the grain into its component parts during subsequent milling. As the grain steeps in a conventional steeping apparatus, the grain sticks together. Those areas of grain-to-grain contact resulting from sticking receive insufficient contact with the liquid mixture to result in complete and uniform hydration of each individual kernel. In addition, due to the tall height of some of the steeping vessels, grain located at the bottom of these vessels experiences significantly higher fluid pressures than grain located at the top. The grain at the bottom experiences both higher fluid pressure and less exposure to the fluid mixture because of the increased grain-to-grain contact due to the pressure. The result is that between the top and the bottom of a conventional grain steeping vessel, corn does not experience uniform steeping.

There have been some efforts to improve the steeping process. The addition of $SO_2$ to the water does increase the rate of steeping, however, the steeping enhancing effect of the $SO_2$ plateaus at higher concentrations of the additive. In addition, $SO_2$ is a relatively caustic and corrosive material, therefore requiring extra safety procedures and vessels able to withstand the corrosive effect of the material.

Efforts have been made to recirculate the liquid mixture through steeping vessels to increase the uniformity and speed of the steeping process. Such recirculation methods have not effectively dealt with the issue of grain-to-grain contact and pressure differentials within large steeping vessels, and so have had limited effect of improving steeping.

A further concern for the proper steeping of grain is the maintaining of the grain kernel integrity. If the kernel is broken open prior to milling, valuable starches will be lost from the refining process. Any improvement in steeping cannot therefore be at the expense of damaging the hull of the grain.

Additionally, millers have a large capital expenditure in their present steeping equipment. Any improvement in steeping would be most economically feasible if it allows retrofitting of existing steeping equipment. The new equipment should also be simple to operate and maintain so as not to increase costs of production.

SUMMARY OF THE INVENTION

An object of the invention is to decrease the steeping time required for grains.

It is another object of the invention to increase the uniformity of the steeping of grain within a steeping vessel.

It is further object of the invention to steep grain in the manner that does not damage the grain and reduce its value for downstream processing.

It is yet a further object of the invention to provide a grain steeping system that can be readily retro-fitted to existing steeping tanks.

It is yet another objective of the invention to provide a grain steeping system that is simple to operate and maintain.

These and other objects can be met by the new and novel apparatus and method of the present invention.

In an apparatus embodying the features of the invention, grain is circulated through the steeping tank. Grain is taken from the bottom of the steeping tank and circulated by use of a fluid circulating means from the bottom of the tank to the top of the tank. By use of such a circulating system, the time required for steeping can be reduced by as much as 30% without adversely affecting the quality of the steeped grain.

In the preferred embodiment of the invention, corn, water and $SO_2$ are placed in a large steeping vessel. A fluid connection, such as a pipe, connect the bottom of the tank to the top of the tank. Air is introduced at the bottom of the fluid connection to act as a pumping medium along with the steeping fluid of the tank to create a circulatory system that gently transports grain from the bottom to the top of the tank. This air and water circulation system is sufficiently gentle on the grain so as not to destroy the hull integrity of the grain. It is important in the steeping of grain that the kernel maintain its integrity even though it has been softened.

The circulation method can also be accomplished by use of a liquid pumping system, transporting the steeping water along with the grain from the bottom of the tank to the top of the tank. Any liquid pumping system must be of sufficient gentle qualities to maintain the integrity of the kernels.

The apparatus flow rate of the invention can turn over the volume of grain in a steeping tank from 1–4 times. In the preferred embodiment, the rate of the flow of the grain is sufficient to cause complete turnover of all the grain in the tank at least twice during the steeping of a given quantity of grain. In most cases, it would be effective to turn over the complete volume of the tank in about 12 hours. The result of such a rate would be a similar amount of time for steeping as that of the conventional steeping processes now used. The turnover, however, would result in a better steeped or hydrated grain than results from the conventional steeping process over the same period of time. However, in many cases it may be preferable to shorten the steeping time rather than improve steeped grain quality because mill operation has been adjusted for lower quality steeped grain. Of course, a mill operator may choose a combination of improved grain quality and decreased steep time to meet certain operating parameters.

The circulation of the grain in the tank results in uniform steeping of the grain. Since all the grain will circulate during a complete turnover period, all the grains will be subject to the same liquid pressures from top to bottom of the steeping vessel. Additionally, circulation will expose the entire kernel to the steeping fluid, reducing the effect of grain to grain contact.

BRIEF DESCRIPTION OF THE DRAWINGS

These and other objects and advantages of the invention will become more evident from the following description of the preferred embodiments and the accompanying drawings, in which.

DETAILED DESCRIPTION OF THE DRAWINGS

Figure 1:
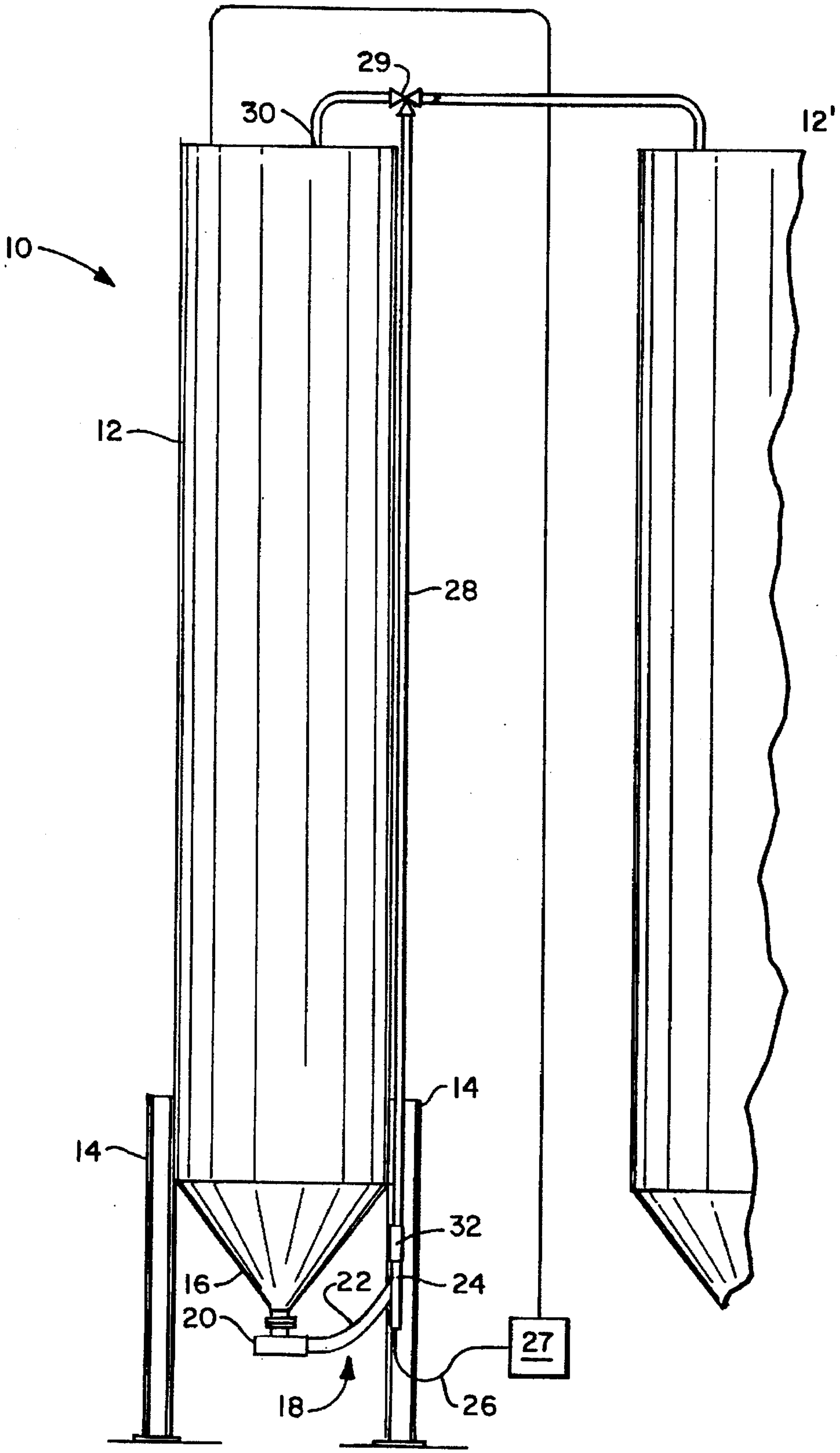
FIG. 1 is a partial cutaway elevation view of a steeping tank having a side-mounted air lift grain circulator.

FIG. 1 is a side elevation view of a grain steeping tank 10 having a side mounted air lift grain circulation system 18. The tank 12, supported by columns 14, is filled with the grain to be steeped. The most typical grain steeped, is corn, but other grains can be steeped for such uses as alcohol production. Corn is mixed with water and $SO_2$ for the steeping process. A typical concentration of $SO_2$ is about 1,000 ppm, some of which will be consumed in the steeping process. Steeping may also be performed with other softening agents. Furthermore, steeping agents are not required for proper steeping, but do serve to reduce steep times.

The tank 12 typically has a lower conical section 16 to aid in the removal of the steeped grain mixture. The air lift grain circulation system generally shown as 18 can be easily retrofitted to the tank 12 which is typical of conventional grain steeping tanks. These tanks are usually ten feet in diameter and 20 feet in height, but can extend to 60 feet or more in height.

The grain transport system for the circulation of grain comprises a collection chamber 20 at the bottom portion of the conical section 16. A connecting pipe 22 fluidly connects the bottom of the tank 12 to the air injector 24. Air is injected along line 26 to cause bubbles in the chamber of the grain circulator 24 to drive a mixture of the steeping solution and grain up through transport pipe 28 which is disposed along the side of tank 12 and back into the tank at an opening 30 at the top of the tank. Additionally, a valve 29 is provided so the grain could be transported by the system 18 to another steeping tank 12 to complete steeping. During operation of the grain transport system, the combination of grain and liquid, also called slurry, is continuously circulated. The air is injected into the chamber at a single point. For larger tanks, multiple circulation airlift or air pump systems may be employed. Additionally, for tall tanks, supplemental air injectors may be placed in the transport pipe 28 to aid in circulation of the slurry. During operation of the grain transport system, the tank is sealed from atmosphere while the grain steeps. When the tank is filled with the grain liquid mixture or slurry, the tank is not completely filled to the top. Therefore, for the air injection to properly function, the air for injection into chamber 24 along the line 26 must come from the top of the tank through a line 25 and an air compressor 27 so as to equalize pressure.

It is important that the slurry circulation be of a sufficiently gentle nature to not break open the corn kernels as they travel through the system. Grain, in particular corn, consists of several components which need to be separated to obtain the most value from the grain. Corn, for example, consists of fiber, germ, gluten, starch and solubles. If the corn kernel is broken up before the proper milling procedures can occur, valuable starches and insolubles will be lost. Generally, corn will travel from the steeping process to a first grinding process at a disc mill (not shown) where the germ is separated from the remainder of the corn. At this stage, 85–90% of the kernel will be cracked. The grain then goes to a second, third and perhaps more stages of grinding (not shown) where the remainder to the kernels are broken open for complete separation of the corn. Any breaking of the corn hull prior to these milling stages results in waste.

While the cracking open of the kernel is generally to be avoided, there can be advantages to abrading the hull of the grain. In corn, for example, up to 90% of the water that will go into the corn to hydrate the kernel travels through the small dimple on the end of the kernel. The time of hydration can be reduced if more water can be introduced into the kernel through the entire surface of the hull. This may be accomplished by a light abrading of the kernel. Light abrading that does not crack the hull open but does abrade the surface in a way that allows more water to enter the kernel is required. This may be accomplished by the use of a small abrading surface 32 in the transport pipe 28. The use of knives or similar surfaces would be too aggressive and destroy the hull of the corn. Therefore, it is preferred to use a surface that is more rough, like sandpaper, than sharp and cutting. Such a surface might include a dimpled surface or a knurled surface. The area of the abrading surface is small so as not to be too aggressive with the abrasion of the kernels. The abrading surface may be located anywhere in the transport tube.

It is also recognized that an alternative fluid pumping systems may be employed to circulate the grain and steeping fluid mixture. A water venturi pump could be substituted for the air lift pump of FIG. 1 to draw grain from the bottom of the tank and deposit the grain at the top of the tank in a sufficiently gentle manner.

Figure 2:
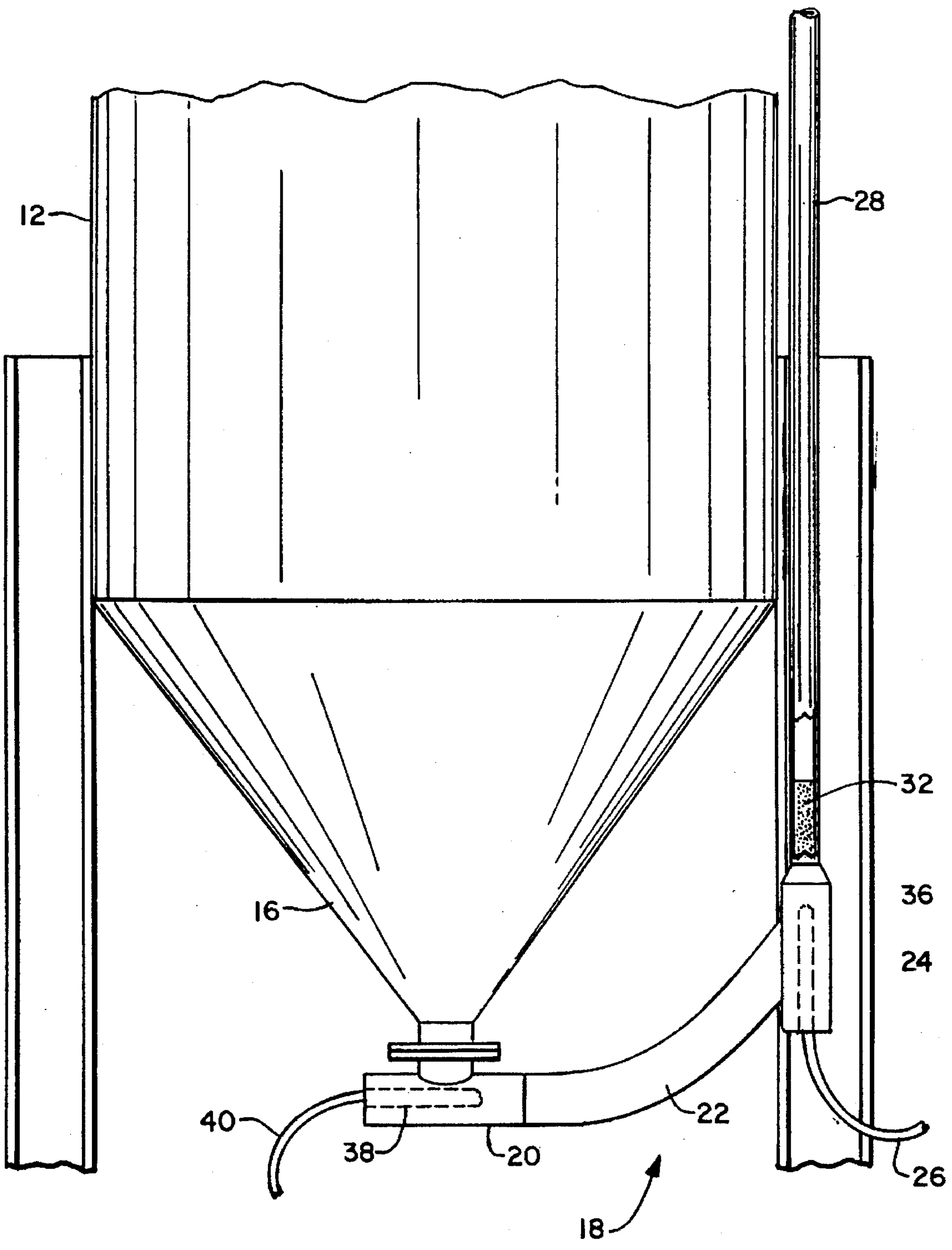
FIG. 2 is a detail view of the lower portion of an air lift grain circulator system of FIG. 1.

In another embodiment, air chamber 24, an air injector 36 is fed by the air line 26 (see FIG. 2). An additional air injector 38 can be located in the collection chamber 20 and is fed by air line 40. Air line 40 and air line 26 could be fed from the same source for a simpler construction. Again, it is preferable to draw the air for each of these injectors from the top of the tank to equalize air pressure due to sealing the tank during steeping. The air injected by injector 38 helps propel the grain and steeping fluid mixture along connecting pipe 22 to the second air injector 36 where it is forced up the transport pipe 28 to the top of the tank. In addition, the detailed drawing shows the abrading surface 32 on the inside of the transport pipe 28. This abrading surface may be located anywhere in the transport pipe 28. The length and/or location of this abrasion area can be varied depending on the amount of abrasion required for the grain at a particular flow rate.

Alternatively, the circulation system can be centrally located in the steeping tank. (See FIG. 3.) A plurality of circulation tubes 42 are centrally located in a column 44. Located at the bottom of the transport tubes 42 are air lift pumps 46. Each tube 42 extends continuously through the column 44 to the top portion of the tank where the tubes discharge the corn and water mixture. Abrasion surfaces may also be included in the circulation tubes 42.

Figure 3:
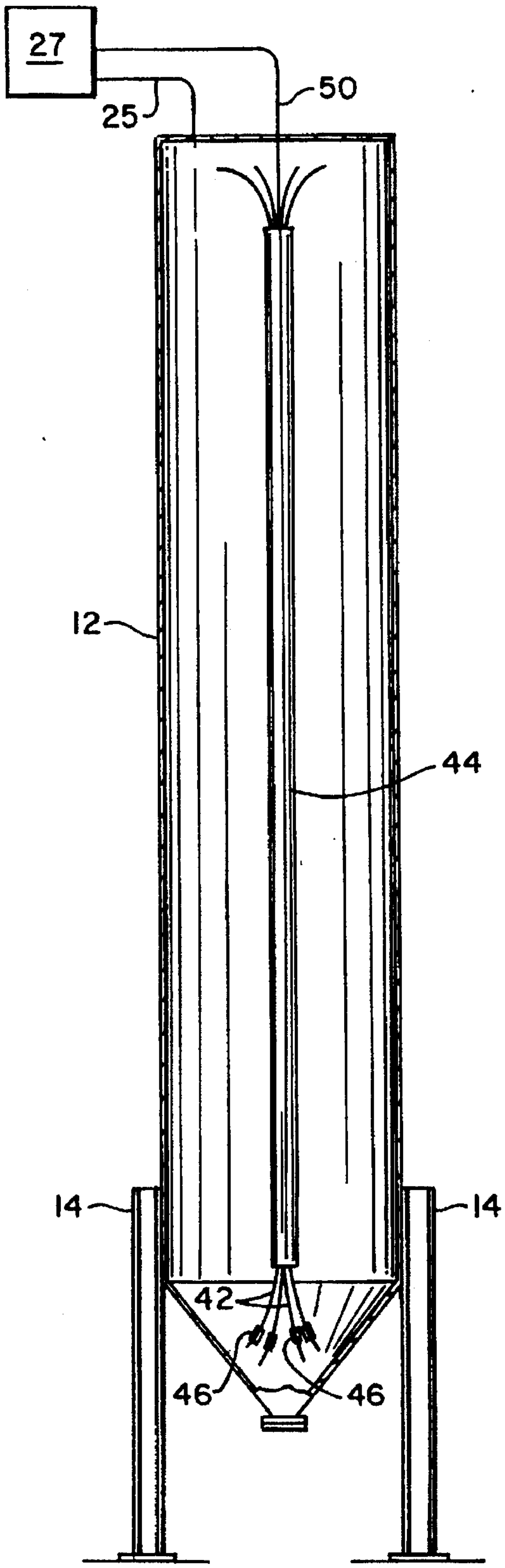
FIG. 3 is a partial cutaway elevation view of an air lift grain circulator centrally located in a grain steeping tank.
Figure 4:
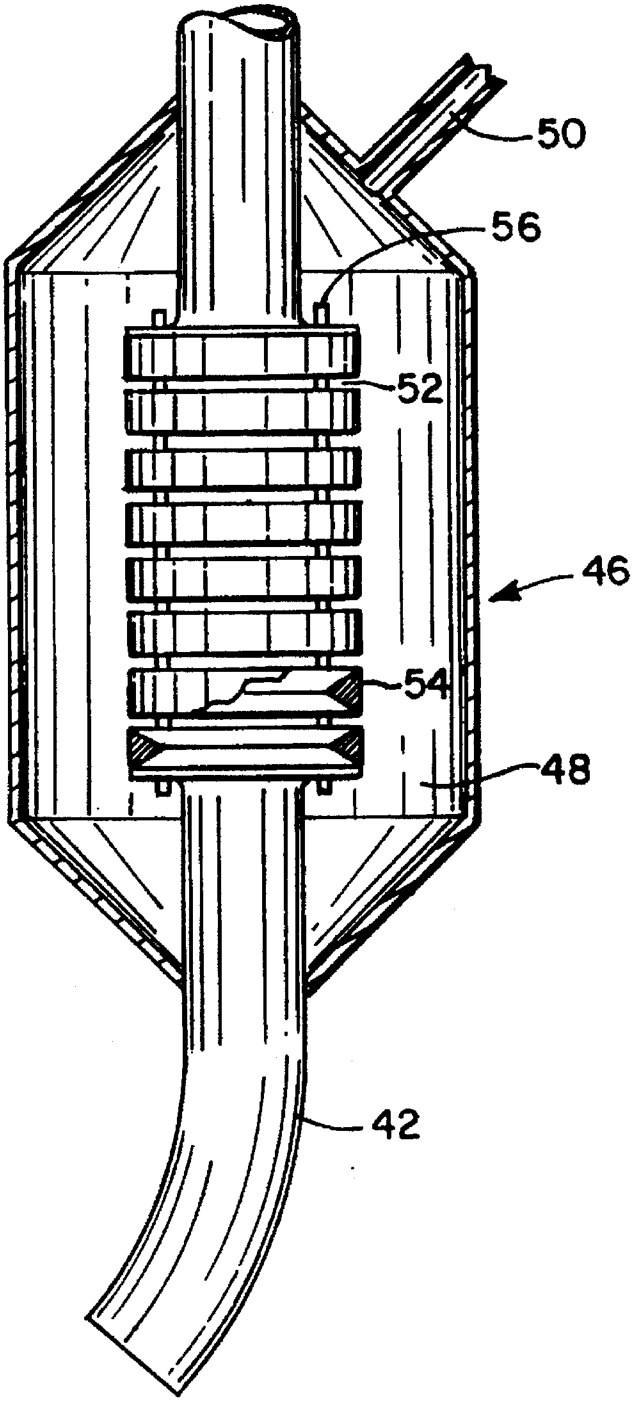
FIG. 4 is a detail view of the air lift grain circulator of FIG. 3.

The transport tube 46 can also be constructed to run through the middle of the air lift chamber 48. (See FIG. 4.) The chamber 48 is fed by an air pressure line 50. pressurized air, preferably drawn from the top of the tank along line 25 (as shown in FIG. 3), is introduced at line 50 into the chamber 48. The air then travels through slots 52 into the transport tube 42. The air, after it enters the plurality of slots, creates bubbles that travel up the transport tube 42, thus creating a current that draws the slurry up the transport tube to the top of the tank. The slots 52 are created by a plurality of rings 54 which are of a triangular cross section. These rings are held in spaced apart relation by supports 56. In the preferred embodiment, the air tube 50 would come through the central column 44 at the bottom of the tank down to the air lift chamber 48.

Figure 5:
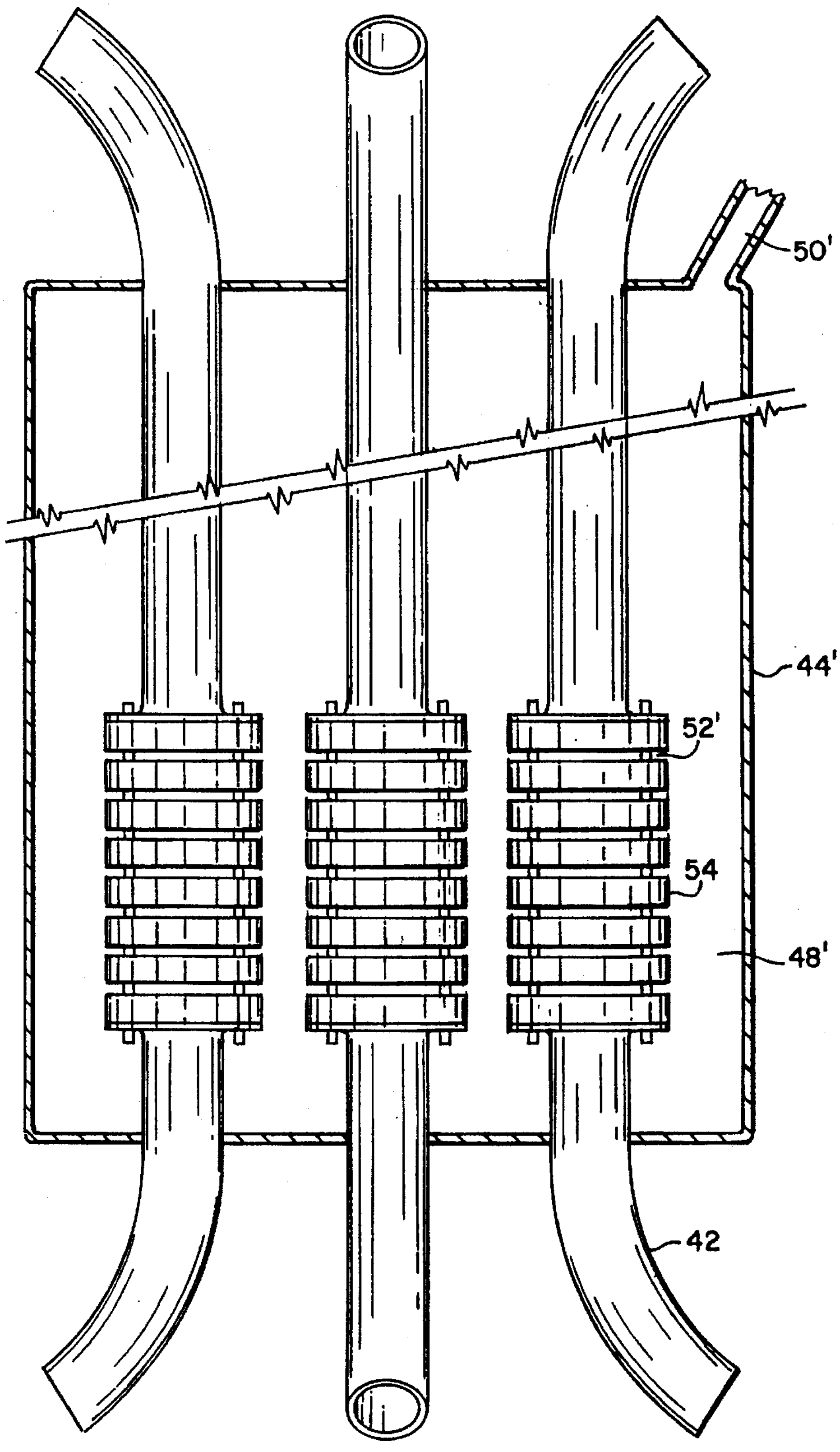
FIG. 5 is a detail view of an alternate embodiment of the air lift grain circulator of FIG. 3.

In another embodiment of the central-positioned air lift grain circulation system, the column 44' serves as the outside wall of the chamber 48'. (See FIG. 5.) The plurality of transport tubes and air lifts are disposed inside the chamber 48'. All of the air lifts are then fed by a single air line 50'. The air line can be introduced at the top of the column to pressurize the entire column. The air would enter each transport tube at the bottom again through slots 52'. The advantage of this particular system is its relatively simple construction and the ability to be retrofitted to preexisting steeping tanks. The central column can be constructed and fixed in position in the central portion of the tank. The tank need only be modified to have support structure hold the column in place and have a single air line 50 enter through the outside wall of the tank, and an additional port to draw air from the top of the tank.

A general advantage of all the air lift circulation systems is the absence of moving parts. The only requirement is a source of compressed air to power each system resulting in a system of grain transport that is simple to operate and maintain.

While a preferred embodiment of the foregoing invention has been set forth for purposes of illustration, the foregoing description should not be deemed a limitation of the invention herein. Accordingly, various modifications, adaptations and alternatives may occur to one skilled int he art without departing from the spirit and the scope of the present invention.

I claim:

1. An apparatus for the steeping of grain comprising:

a tank for steeping grain having a top portion and a bottom portion;

a slurry, comprising grain and a liquid, in said tank; and grain transport means for fluidly circulating said slurry between the bottom portion of the tank and the top portion of the tank.

2. The apparatus of claim 1 wherein the grain transport means comprises an air lift pump located outside the tank.

3. The apparatus of claim 1 wherein the grain transport means comprises:

a pipe located outside of the tank, said pipe forming a fluid path from the bottom portion to the top portion of the tank; and an airlift pump mounted to said pipe.

4. The apparatus of claim 3 further comprising an abrader in the pipe to abrade the grain in a manner to speed the absorption of water without destroying kernel integrity.

5. The apparatus of claim 1, wherein the grain transport means comprises an air lift pump located in the tank.

6. The apparatus of claim 1, wherein the grain transport means comprises an air lift pump located in the tank and a pipe forming a fluid path from the air lift pump to the top portion of the tank.

7. The apparatus of claim 1 wherein the grain transport means comprises a pipe in fluid connection with the bottom portion of the tank and the top portion of the tank.

8. The apparatus of claim 1 wherein the tank is greater than 20 feet in height.

9. The apparatus of claim 1 wherein the grain transport means circulates said slurry from the bottom of the tank to the top of the tank.

10. The apparatus of claim 9 wherein the grain transport means further comprises an air lift pump.

11. The apparatus of claim 9 wherein the grain transport means further comprises an air lift pump located inside the tank.

12. The apparatus of claim 9 wherein the grain transport means further comprises an air lift pump located outside the tank.

13. The apparatus of claim 9 wherein the tank is tapered at the bottom portion.

14. The apparatus of claim 1 wherein the grain transport means further comprises a pipe in the tank, the pipe in fluid connection with the bottom portion and the top portion of the tank; and an air lift pump mounted to said pipe.

15. The apparatus of claim 14 further comprising a plurality of pipes and air lift pumps.

16. The apparatus of claim 14 wherein the tank is tapered at the bottom portion.

17. An apparatus for the steeping of grain comprising:

a first steeping tank having a top portion and a bottom portion;

a second steeping tank;

a slurry of grain and liquid in said first steeping tank; and grain transport means for transporting said slurry from the bottom portion of said first tank and into the second tank.

18. A grain circulation system for a steeping tank for holding a slurry, said tank comprising a bottom portion and a top portion, said system comprising:

a fluid transport pipe means for fluidly connecting said bottom portion to said top portion of said tank;

a slurry of grain and liquid in said tank;

an air pump means mounted to said pipe means for injecting air into said pipe to circulate said slurry from said bottom portion to said top portion of said tank.

19. The grain circulation system of claim 18 wherein said pipe means is outside of said tank.

20. The grain circulation system of claim 19 further comprising a second air pump means mounted to said pipe means.

21. The grain circulation system of claim 19 further comprising abrading means for abrading grain transported in said pipe means, said abrading means for abrading grain to increase fluid absorption of the grain.

22. The grain circulation system of claim 18 wherein said pipe means has a pipe top portion in fluid connection with said top portion of said tank and a pipe bottom portion in fluid connection with said bottom portion of said tank, and said air pump means is mounted to said pipe bottom portion.

23. The grain circulation system of claim 18 wherein said pipe means is located in said steeping tank.

24. The grain circulation system of claim 23 wherein said air pump means comprises a plurality of spaced apart rings defining a transport column for said slurry.

25. The grain circulation system of claim 24 wherein said rings have a triangular cross-section.

26. The grain circulation system of claim 24 further comprising an air chamber surrounding said rings; and an air injection port means for allowing air into said chamber.

27. The grain circulation system of claim 26 wherein said air chamber extends from said top portion to said bottom portion of said tank.

28. The grain circulation system of claim 27 further comprising a plurality of air pump means in said chamber.

29. The grain circulation system of claim 23 further comprising abrading means in said pipe for abrading grain to increase absorption of fluid by said grain.

30. The grain circulation system of claim 23 further comprising a plurality of air pump means in said pipe.

31. The grain circulation system of claim 23 wherein said pipe means comprises a plurality of pipes.

32. The grain circulation system of claim 31 wherein an air pump is mounted to each pipe.

33. An apparatus for the steeping of grain comprising:

a tank for steeping grain having a top portion and a bottom portion; and grain transport means for fluidly circulating grain between the bottom portion of the tank and the top portion of the tank, said grain transport means comprising an air lift pump located in the tank.

34. The apparatus of claim 33, wherein the grain transport means further comprises a pipe forming a fluid path from the air lift pump to the top portion of the tank.

35. The apparatus of claim 34 further comprising an abrader in the pipe to abrade the grain in a manner to speed the absorption of water without destroying kernel integrity.

36. The apparatus of claim 33 wherein the grain transport means comprises a pipe in fluid connection with the bottom portion of the tank and the top portion of the tank.

37. The apparatus of claim 33 wherein the grain transport means circulates the grain from the bottom of the tank to the top of the tank.

38. The apparatus of claim 33 further comprising a plurality of pipes and air pumps.

39. A grain circulation system for a steeping tank for holding grain and fluid, said tank comprising a bottom portion and a top portion, said system comprising:

a fluid transport pipe means for fluidly connecting said bottom portion to said top portion of said tank;

an air pump means mounted to said pipe means for injecting air into said pipe to circulate grain and fluid from said bottom portion to said top portion of said tank, said air pump means comprising a plurality of spaced apart rings defining a transport column for grain and fluid.

40. The grain circulation system of claim 39 further comprising abrading means for abrading grain transported in said pipe means, said abrading means for abrading grain to increase fluid absorption of the grain.

41. The grain circulation system of claim 39 wherein said rings have a triangular cross-section.

42. The grain circulation system of claim 39 further comprising an air chamber surrounding said rings; and an air injection port means for allowing air into said chamber.

43. The grain circulation system of claim 42 wherein said air chamber extends from said top portion to said bottom portion of said tank.

44. The grain circulation system of claim 43 further comprising abrading means in said pipe for abrading grain to increase absorption of fluid by said grain.

45. The grain circulation system of claim 43 further comprising a plurality of air pump means in said chamber.

46. The grain circulation system of claim 39 further comprising a plurality of air pump means in said pipe.

47. The grain circulation system of claim 39 wherein said pipe means comprises a plurality of pipes.

48. The grain circulation system of claim 47 wherein an air pump is mounted to each pipe.

* * * * *